May 21, 1957  E. D. SIGLER  2,792,683
NUT PICKUP DEVICE
Filed Sept. 26, 1955  2 Sheets-Sheet 2
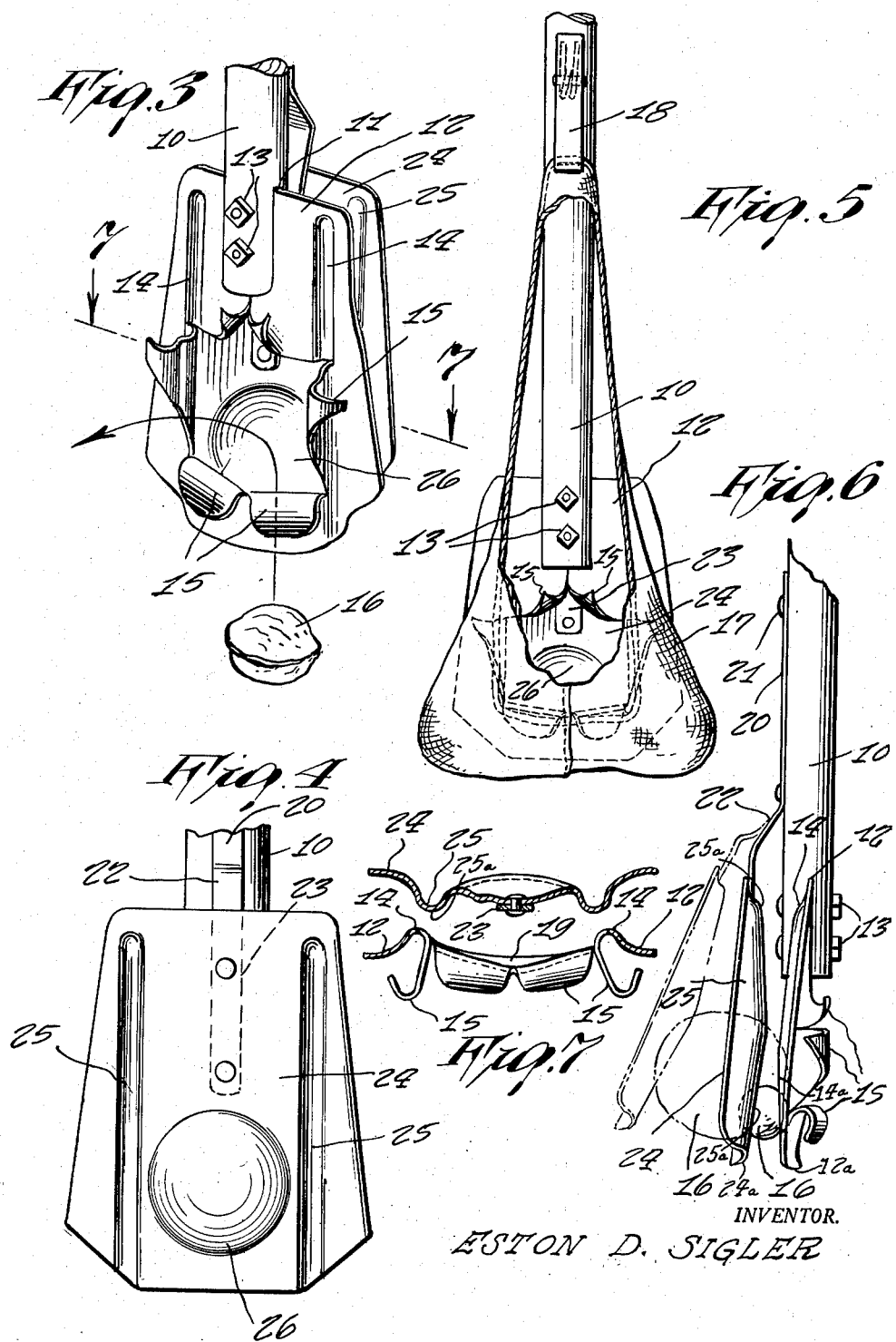
INVENTOR.
ESTON D. SIGLER

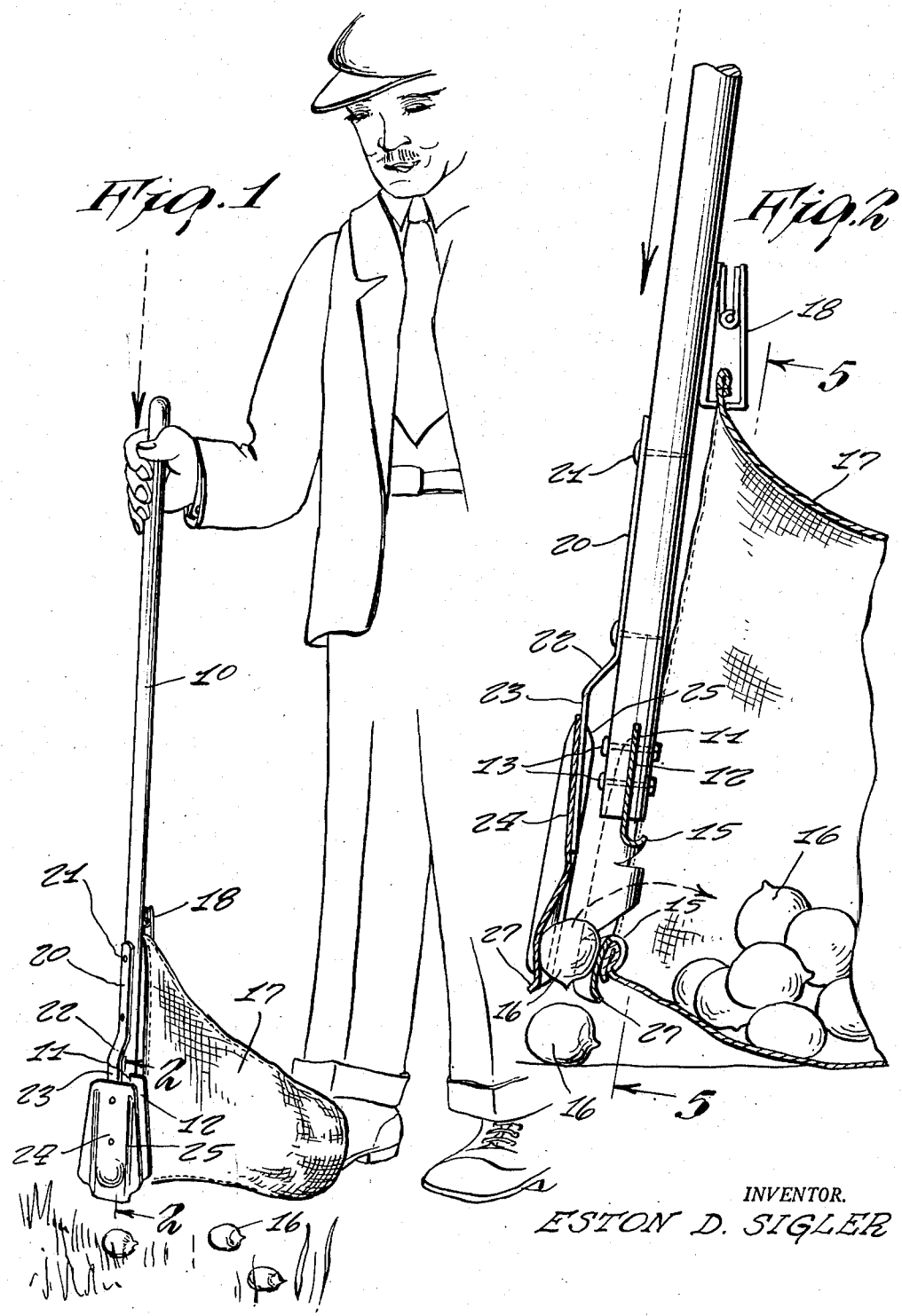

United States Patent Office 2,792,683
Patented May 21, 1957

2,792,683

NUT PICKUP DEVICE

Eston D. Sigler, Lake Charles, La.

Application September 26, 1955, Serial No. 536,595

3 Claims. (Cl. 56—328)

This invention relates to nut pickers.

It is an object of the present invention to provide a nut picker which can be used from a standing position and wherein a plurality of nuts may be picked or deposited into a sack, forming a part of the invention, without the necessity of bending over.

It is another object of the present invention to provide a nut picker of the above type wherein the nuts are individually trapped between the jaws of the device and are then automatically urged upwardly to drop into a sack upon the trapping of the next nut.

Other objects of the invention are to provide a nut picker bearing the above objects in mind which is of simple construction, has a minimum number of parts, is inexpensive to manufacture and efficient in operation.

For other objects and a better understanding of the invention, reference may be had to the following detailed description taken in connection with the accompanying drawing, in which:

Figure 1 is a perspective view of a preferred embodiment of the present invention shown in operative use picking pecan nuts from a standing position;

Fig. 2 is an enlarged vertical sectional view taken along the line 2—2 of Fig. 1;

Fig. 3 is an enlarged fragmentary perspective view of the movable and stationary jaw which opens into the sack, said sack being omitted;

Fig. 4 is an enlarged front elevational view of the movable jaw forming another part of the invention;

Fig. 5 is a vertical sectional view taken along the line 5—5 of Fig. 2;

Fig. 6 is an enlarged side elevational view of the device showing the movement of the movable jaw in phantom upon trapping of a nut of relatively large size, the sack being omitted;

Fig. 7 is a horizontal sectional view taken along the line 7—7 of Fig. 3.

Referring now more in the detail to the drawing, 10 indicates an elongated handle adapted to be held at its upper end (Fig. 1) and provided at its lower end with a longitudinal upwardly extending slot 11, substantially as illustrated.

A thin stationary jaw 12 of metal or other suitable material is positioned within the slot 11 by means of mounting openings, not shown, and the nut and bolt assemblies 13, the stationary jaw 12 extending downwardly below the lower end of handle 10. The stationary jaw 12 is provided with the inwardly stamped longitudinally extending ribs 14 on each side of the handle 10 and is inclined slightly to the vertical (Fig. 6). The portion of the stationary jaw 14 below the lower end of handle 10 is provided with a jagged opening, and is integrally formed around this opening with the outwardly bent jagged segments 15 (Fig. 3). The opening thus formed permits the pecan nuts or the like 16 to pass upwardly and then rearwardly therethrough in the direction of the arrow of Fig. 3, the jagged portions 15 serving to secure therearound the open end of the sack 17, the upper end of which is secured to the handle 10 by means of a spring clamp 18, suitably secured to the handle. The lower end of the stationary jaw 12 before providing the opening therein is formed with a fully concave bend on a longitudinal axis and a rearwardly concave bend on a transverse axis at the lower end, both of which extend below the opening (Fig. 7) as at 19 to facilitate the upward movement of the nuts through the opening. The inner sides 14a of the ribs 14 also converge upwardly and inwardly towards this opening to further facilitate the movement of the nuts therethrough (Fig. 6).

An elongated metallic strip 20 of spring metal is secured to the handle 10 by means of screws 21 and is integrally formed at its lower end with the downwardly and outwardly extending portion 22 which terminates in the laterally offset depending portion 23 suspended in laterally spaced relationship in the stationary jaw 12.

The depending portion 23 is riveted or otherwise secured to a movable jaw 24 of vertical V-shaped cross section (Fig. 2), having the same size and shape as the stationary jaw 12, save for its V-shape vertical cross section. Thus, the lower portion of the movable jaw 24 will extend downwardly and outwardly from the stationary jaw to facilitate the grasping of the nuts. The movable jaw 24 is also formed on opposite sides of the handle 10 with the longitudinally extending, inwardly stamped ribs 25 of semicircular cross section (Fig. 7) which have inwardly and upwardly extending inner sides 25a to conduct the nuts to the central portion of the jaw. It will be noted that the inner sides 25a and 14a of ribs 25 and 14 extend upwardly toward each other. The movable jaw 24 below handle 10 and between the ribs 25 is stamped outwardly from the stationary jaw with a hemispherical concave portion 26 which is aligned laterally with the concave portion 19 of the stationary jaw and which is adapted to receive therewithin the adjacent face of the nut 16 to be retained resiliently by the action of the spring 22, 23. The lower edges 12a and 24a of the jaws 12 and 24 respectively are flared outwardly (Fig. 2) as at 27 to facilitate the downward movement onto the nut and the movement of the nut upwardly to the position intermediate the concave portions 26 and 19.

In operation, the device is held with the upper end of the handle 10 in one hand and the outwardly flared lower edges of the jaws are pressed downwardly onto the nut 16 (Figs. 1 and 2). The nut will be trapped intermediate the concave portions 26 and 19 (Fig. 2) to be retained thereat until the next nut is trapped. The next nut moving upwardly into the concave portions 26, 19 will force the nut directly thereabove upwardly and through the opening in the stationary jaw into the sack 17. Due to the vertical V-shaped cross section of the movable jaw it will be noted that the lower portion of the movable jaw will normally extend away from the lower portion of the stationary jaw (Fig. 6). The spring member 22, 23 will retain the jaws in resilient engagement with the nut and the concave portions 19, 26 until forced into the sack. The first nut to be positioned in the concave portions will also maintain the jaws in spaced relationship to permit the upward movement of the next nut, which latter will push the nut directly thereabove into the bag. The size of the sack may, of course, vary.

It should now be apparent that there has been provided a nut picker which will permit the picking of the nuts without stooping and which will permit a plurality of nuts to be picked without handling them individually.

While various changes may be made in the detail construction, it shall be understood that such changes shall be within the spirit and scope of the present invention as defined by the appended claims.

What I claim as new and desire to protect by Letters Patent of the United States is:

1. A nut picker comprising an elongated handle, a thin, laterally extending stationary jaw secured to the lower end of said handle and extending downwardly therebelow, said stationary jaw being inclined slightly to the longitudinal axis of said handle and extending downwardly and forwardly thereof, said stationary jaw below the lower end of said handle having an opening adapted to receive therethrough a nut or the like, a sack, means for securing the open end of said sack to the rear face of said stationary jaw around said opening therein, an elongated strip of spring metal secured to said handle above said stationary jaw, said strip at its lower end being integrally formed with a downwardly and forwardly extending portion terminating in a vertical depending portion extending parallel to and in laterally spaced relationship to said handle, said vertical depending portion extending downwardly below the lower end of said handle, a thin movable jaw adapted to cooperate with said stationary jaw, said movable jaw being secured to said vertical depending portion of said strip, said movable jaw being of substantially V-shaped cross section in a vertical direction and having an upper and lower portion, said lower portion extending downwardly and away from said stationary jaw to facilitate the upward movement between said jaws of a nut or the like, said stationary jaw having a fully concave bend on a longitudinal axis and a rearwardly concave bend on a transverse axis at the lower end thereof, the lower portion of said movable jaw having a substantially hemispherical concavity adapted to receive the adjacent face of a nut therewithin in cooperation with the rearwardly concave bend on a transverse axis at the lower end of said stationary jaw and to resiliently retain the same thereat below said stationary jaw opening, the lower edges of said stationary and movable jaws extending downwardly and outwardly and away from each other to facilitate the upward movement of the nut or the like between said jaws into said concavity until the nut is forced through the opening into the sack by the next nut similarly positioned.

2. A nut picker according to claim 1, including a pair of longitudinally extending and inwardly directed, laterally spaced ribs, having inner faces, on said stationary jaw, the inner faces of said ribs extending downwardly and rearwardly from said stationary jaw opening, and a second pair of longitudinally extending and inwardly directed, laterally spaced ribs, having inner faces, on said movable jaw aligned laterally with said stationary jaw ribs, the inner faces of said second ribs extending inwardly and upwardly towards said stationary jaw opening, whereby to facilitate the passage upwardly between said first and second mentioned ribs of a nut or the like and to serve as a guide therefor.

3. A nut picker according to claim 2, said means for securing the open end of said sack about said stationary jaw opening comprising rearwardly and outwardly extending prongs, which define said opening, mounted on said stationary jaw and engaging the open edge of the sack, and a spring clip mounted on said handle above said jaws engaging the upper end of the sack.

References Cited in the file of this patent
UNITED STATES PATENTS

| | | |
|---|---|---|
| 458,614 | Buddenberg | Sept. 1, 1891 |
| 906,626 | Hensley | Dec. 15, 1908 |
| 1,914,246 | Entrikin | June 13, 1933 |
| 2,189,713 | Hansen | Feb. 6, 1940 |
| 2,205,345 | Christensen | June 18, 1940 |
| 2,720,409 | Griffith | Oct. 11, 1955 |